United States Patent
Grissom et al.

(10) Patent No.: US 10,053,995 B2
(45) Date of Patent: Aug. 21, 2018

(54) PULSE ENERGY ENHANCED TURBINE FOR AUTOMOTIVE TURBOCHARGERS

(71) Applicant: BorgWarner Inc., Auburn Hills, MI (US)

(72) Inventors: Thomas A. Grissom, Dexter, MI (US); Brock S. Fraser, Asheville, NC (US); Mike Ausbrooks, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 50 days.

(21) Appl. No.: 14/892,823

(22) PCT Filed: May 27, 2014

(86) PCT No.: PCT/US2014/039491
§ 371 (c)(1),
(2) Date: Nov. 20, 2015

(87) PCT Pub. No.: WO2014/193779
PCT Pub. Date: Dec. 4, 2014

(65) Prior Publication Data
US 2016/0115802 A1     Apr. 28, 2016

Related U.S. Application Data

(60) Provisional application No. 61/829,289, filed on May 31, 2013.

(51) Int. Cl.
*F02D 23/00* (2006.01)
*F02B 33/44* (2006.01)
(Continued)

(52) U.S. Cl.
CPC .............. *F01D 9/026* (2013.01); *F01D 5/02* (2013.01); *F01D 5/048* (2013.01); *F01D 17/105* (2013.01);
(Continued)

(58) Field of Classification Search
CPC ....... F02B 37/025; F02B 37/18–37/186; F02B 39/00; F01D 9/026; F01D 5/048; F01D 17/105
(Continued)

(56) References Cited

U.S. PATENT DOCUMENTS 3,270,495 A * 9/1966 Connor ................. F02B 37/025
60/602
4,143,994 A * 3/1979 Yamaguchi ............. F01D 9/026
415/205
(Continued)

FOREIGN PATENT DOCUMENTS

DE    102008020406 A1 * 10/2009 ............ F02B 37/025

OTHER PUBLICATIONS

Definition of "around" obtained from Merriam Webster's dictionary on Nov. 11, 2017.*

*Primary Examiner* — Ngoc T Nguyen
(74) *Attorney, Agent, or Firm* — Young Basile Hanlon & MacFarlane, P.C.

(57) ABSTRACT

A turbocharger with a turbine (10) having a turbine wheel (12) in a turbine housing (14) with an associated manifold (24) having individual ports (22) corresponding to unobstructed passageways (26) from each cylinder of an engine. The ports (22) are substantially equally spaced around a face of the turbine wheel (12) to preserve benefits of pulses without interference.

8 Claims, 4 Drawing Sheets

(51) Int. Cl.
*F01D 9/02* (2006.01)
*F02B 37/18* (2006.01)
*F02B 39/00* (2006.01)
*F01D 5/04* (2006.01)
*F01D 17/10* (2006.01)
*F01D 5/02* (2006.01)
*F02B 33/40* (2006.01)
*F02B 39/08* (2006.01)

(52) U.S. Cl.
CPC .............. *F02B 33/40* (2013.01); *F02B 37/18* (2013.01); *F02B 37/183* (2013.01); *F02B 39/00* (2013.01); *F02B 39/08* (2013.01); F05D 2220/40 (2013.01); F05D 2240/24 (2013.01); F05D 2260/16 (2013.01); Y02T 10/144 (2013.01)

(58) Field of Classification Search
USPC .......................................................... 60/602
See application file for complete search history.

(56) References Cited

U.S. PATENT DOCUMENTS

| | | | |
|---|---|---|---|
| 7,269,950 B2* | 9/2007 | Pedersen | F02B 37/025 60/602 |
| 2003/0000211 A1* | 1/2003 | Drangel | F02B 37/025 60/602 |
| 2004/0244373 A1 | 12/2004 | Frankenstein et al. | |
| 2005/0086936 A1* | 4/2005 | Bucknell | F02B 37/025 60/602 |
| 2005/0178122 A1 | 8/2005 | Hastings et al. | |
| 2007/0209361 A1* | 9/2007 | Pedersen | F02B 37/025 60/602 |
| 2009/0094978 A1 | 4/2009 | Yamagata et al. | |
| 2011/0252792 A1 | 10/2011 | Kares et al. | |
| 2012/0060494 A1* | 3/2012 | Sato | F02B 37/025 60/602 |
| 2012/0285163 A1 | 11/2012 | Hayman et al. | |

* cited by examiner

PULSE ENERGY ENHANCED TURBINE FOR AUTOMOTIVE TURBOCHARGERS

CROSS-REFERENCE TO RELATED APPLICATIONS

This application claims priority to and all the benefits of U.S. Provisional Application No. 61/829,289, filed on May 31, 2013, and entitled "Pulse Energy Enhanced Turbine for Automotive Turbochargers."

BACKGROUND

Field of the Disclosure

This disclosure relates to exhaust gas-driven automotive turbochargers having a rotating turbine wheel. More particularly, this disclosure relates to a pulse energy enhanced turbine having equidistant ports around the face of the turbine wheel for individual pulsating exhaust flow corresponding to each cylinder of the engine.

Description of Related Art

Advantages of turbocharging include increased power output, lower fuel consumption and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor impeller that is mounted on the same shaft so that rotation of the turbine wheel causes rotation of the compressor impeller.

Turbochargers typically include a turbine housing connected to the engine's exhaust manifold, a compressor housing connected to the engine's intake manifold, and a center bearing housing coupling the turbine and compressor housings together. The turbine housing defines a volute that surrounds the turbine wheel and that receives exhaust gas from the engine. The turbine wheel in the turbine housing is rotatably driven by an inflow of exhaust gas supplied from the exhaust manifold.

To regulate gas flow, a wastegate turbocharger operates with a wastegate valve assembly (in the turbine housing) which may include a valve, vent and/or bypass that is able to selectively route a portion of the exhaust gas around (i.e. bypassing) the turbine wheel, in order to limit/control turbine work, thus selectively using a fraction of the available exhaust energy that could be extracted from the exhaust gas flow. Thereby, the wastegate valve assembly regulates exhaust gas flow and ensures that the turbine wheel is not spun at an undesirable speed.

There are three primary types of turbines used in turbochargers: axial, radial and mixed-flow. In axial-flow turbines, exhaust gas flow through the turbine wheel is only in the axial direction, along the axis of the turbine wheel. In radial-flow turbines, exhaust gas inflow is centripetal, i.e. in a radial direction from the outside in, and exhaust gas outflow is typically in the axial direction. Initial exhaust gas flow is perpendicular to the axis of rotation. The radial flow turbine wheel has the exhaust gas directed along the radius of the wheel. In mixed-flow turbines, the exhaust gas flow approaches the turbine wheel in a direction between the axial direction and the radial direction.

U.S. Pat. No. 4,850,820 discloses a turbocharger in which gases are directed through the turbine wheel in a generally axial direction. An axial-flow turbine inherently has a lower moment of inertia than does a radial-flow turbine, thus reducing the amount of energy required to accelerate the turbine to operating speed. The low inertia of axial-flow turbines is beneficial for high-speed automotive use, but an axial-flow turbine's low efficiency at diameters matched to the required compressor flow has been a limitation.

An axial-flow turbine typically has lower flow resistance and stress than a radial-flow turbine. Sometimes, axial-flow turbines can be more efficient because the exhaust gas is forced directly against the entire turbine wheel while for radial-flow turbines the exhaust gas flows from the side of the turbine wheel and then around the perimeter of the turbine wheel.

Axial-flow turbines may not perform well at higher expansion ratios, such as are typically needed due to the pulsing nature of the exhaust of an internal combustion engine. Axial-flow turbines also have space limitations for automotive designs.

PCT Application PCT/US2013/26652, filed 19 Feb. 2013, discloses a turbocharger having an axial-flow turbine wheel and an internal heat shield having turning vanes. A heat shield having turning vanes may be used to redirect or guide the exhaust gas to the axial direction before the gas arrives at the turbine wheel.

In multi-cylinder engines, cylinders from opposing banks fire alternately. Exhaust gas flow is not a smooth stream because exhaust gases exit each cylinder based on the engine's firing sequence, resulting in exhaust gas pulses. In the case of a "V" engine, the banks are separated across the engine. In the case of an inline engine, the banks could simply be the front half of cylinders versus the back half of cylinders. The exhaust gas is conducted to turbine housing in separated portions of the volute. The separate gas streams serve to preserve the "pulse" of pressure that occurs when the exhaust gas is released from the cylinder. The preservation of the pulses may be desirable because the extra pulse of pressure can start the turbine moving faster. This can be helpful in reducing turbo lag. In the region where the exhaust gases are admitted to the turbine housing, a separator wall between the two halves of the volute can help preserve the separation between exhaust gases from each cylinder bank, and thus maintain the pressure pulses. A drawback of using an axial-flow turbine wheel and a heat shield in a turning arrangement is that the wheel is now spaced far away from the turbine housing, and hence far away from the housing divider wall and the pulse separation. By adding a divider wall extension to the heat shield, the preservation of pulses can be maintained all the way downstream to the turbine wheel inlet.

In twin-scroll (or two-pulse) turbo systems, divided turbo manifolds have been designed with twin-scroll divided chambers in the volute to enhance the benefits of pulse by separating exhaust gas flow into two branches. Gas flow of an in-line four-cylinder engine from certain cylinders, such as 2 and 3, pass through one branch (passageway) of the manifold, and gas from other cylinders, such as 1 and 4, pass through a separate branch. Gas flow from each branch from respective cylinders stay divided in the twin-scroll in the volute of the turbine housing. The resulting two feed ports (2 and 3 with 1 and 4) deliver opposite and substantially equal firing pulsations to improve turbine efficiency and reduce manifold complexity. Divided manifold runners, such as for in-line four cylinder configurations, enhance pulse utilization by separating exhaust flow with alternating pulses. Similarly, a six-cylinder configuration have cylinders 1, 2 and 3 and combined 4, 5 and 6 as separate branches into two feed ports providing alternating pulses. Twin-scroll turbo systems may have higher backpressure at low rpm (which may help turbo spool-up) and lower backpressure at high rpm (which may help top-end performance).

Thus, it is desired to further improve on separate passageways for preserving individual pulses to the turbine wheel.

SUMMARY

A pulse energy enhanced turbine used with a turbocharger with a turbine wheel reacts to individual pulses of exhaust gas flow from ports substantially equally spaced around the turbine wheel. Exhaust pulsation energy is used in a closely coupled or integrated manifold to deliver both higher efficiency and low inertia without a fixed stator to control flow.

The disclosed turbine receives individual pulses via equidistant ports around the turbine wheel face with minimal interference of pulses from other cylinder heads. The number of ports in a manifold preferably corresponds with the number of cylinders, and the separation and arrangement of ports depend on the number of ports. Each port directs individual pulsations onto the turbine wheel with resulting alternate pulsations across the face of the turbine wheel.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

A turbocharger is generally known and includes a turbine 10 and a compressor, wherein a compressor impeller is rotatably driven via a shaft 16 by a turbine wheel 12. The rotatable shaft 16 passes through a bearing housing between a turbine housing 14 and a compressor housing. The turbine 10 converts exhaust gas pressure into energy to drive the turbine wheel 12, which via the shaft 16 drives the compressor impeller.

Figure 6:
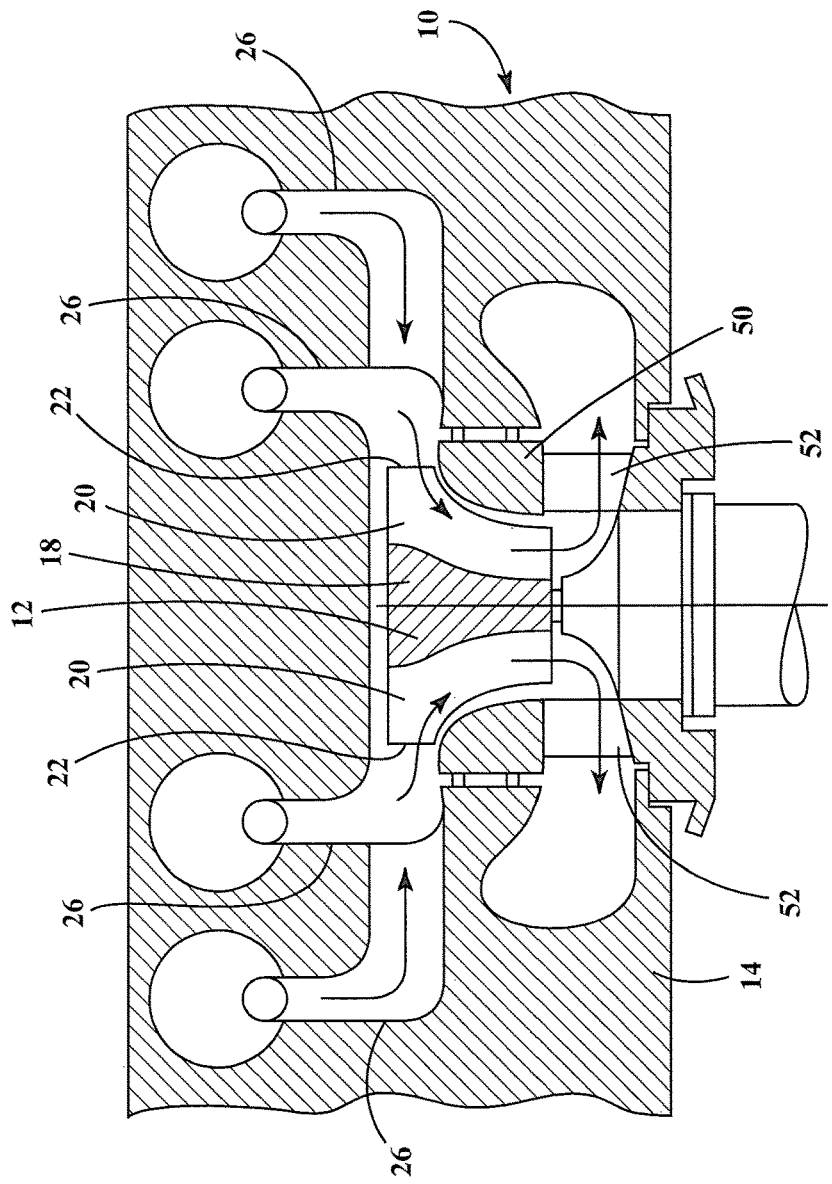
FIG. 6 shows a cross-sectional view of a pulse enhanced radial/mixed flow turbine with four ports in an integrated manifold directing gas flow to the turbine wheel.
Figure 7:
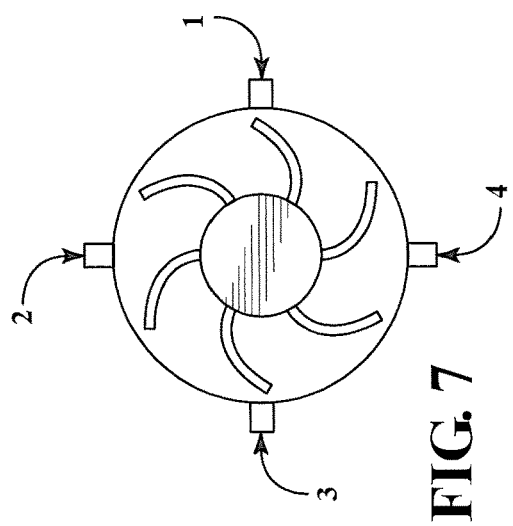
FIG. 7 shows equally spaced pulsation of the four-port turbine of FIG. 6.

In the axial-flow turbine 10 of FIGS. 1-4, gas flows through the turbine wheel 12 in an axial direction. The axial-flow turbine 10 includes the axial-flow turbine wheel 12 substantially within the turbine housing 14. While the axial-flow turbine 10 is the preferred turbocharger, the pulse enhanced turbine can be used with radial or mixed flow turbines as shown in FIGS. 6 and 7.

The axial-flow turbine wheel 12 has a hub 18 and a plurality of axial-flow turbine blades 20 configured to rotate the turbine wheel 12 and the centrally attached rotatable shaft 16 when the turbocharger receives exhaust gas flow from the engine. The axial-flow turbine wheel 12 is designed to react to flow pulsations that are concentrated to impact tips of the blades 20 via substantially equally spaced ports 22 around a face of the turbine wheel 12. Axial-flow turbine wheels 12 may have low-stress small hubs 18 attached to the rotatable shaft 16 by various means. Similarly, a radial or mixed flow turbine wheel 12 has a hub 18 and a plurality of turbine blades 20 configured to rotate the turbine wheel 12 when the turbocharger receives exhaust gas flow from the engine. The radial/mixed-flow turbine wheel 12 would also be designed to react to flow pulsations on the blades 20 radially or mixed between axial and radial via the substantially equally spaced ports 22 around a face of the turbine wheel 12.

Figure 4:
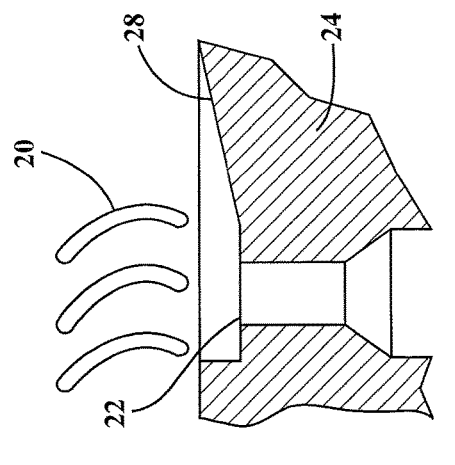
FIG. 4 is cross-sectional view of Section A-A where exhaust pulse affects the axial-flow turbine blades.

In conjunction with each cylinder of a reciprocating engine, a manifold 24, such as a closely coupled separate manifold or an integrated exhaust manifold, will have individual unobstructed passageways 26 to direct individual pulsations from each cylinder onto the turbine wheel 12. Each individual cylinder passageway 26 is preferably sized for an area whose sum is equal to that of a fixed single nozzle turbine housing. The passageways 26 end at each port 22, which may have a tapered port edge 28 as shown in FIG. 4 for residual exhaust gas flow in the direction of movement of the blades 20. An integrated manifold may have passageways 26 integrated into the turbine housing 14, rather than a separate exhaust manifold, to all or part way to the engine cylinders.

The turbine housing 14 preferably attaches directly to a mounting flange 30 without a fixed stator or collector volume to direct exhaust gas flow into the leading edge of the blades 20 of the turbine wheel 12. As such, the individual streams shot at the turbine wheel 12 can maintain the pulse energy without a detrimental effect on exhaust gas flow.

Exhaust gas flow exiting the turbine stage is preferably directed to a collector via a heat shield and volute passage.

A wastegate assembly 40 (in communication with the volute passage in the turbine housing 14) may include a control valve 42 that is selectively opened by a linkage connected to an actuator. Exhaust gas flow is regulated (i.e. some bypassing) though the turbine stage, in order to limit/control turbine work, thus selectively using a fraction of the available exhaust energy. The wastegate port 44 allows bypass gas flow to control the maximum boost pressure.

Figure 1:
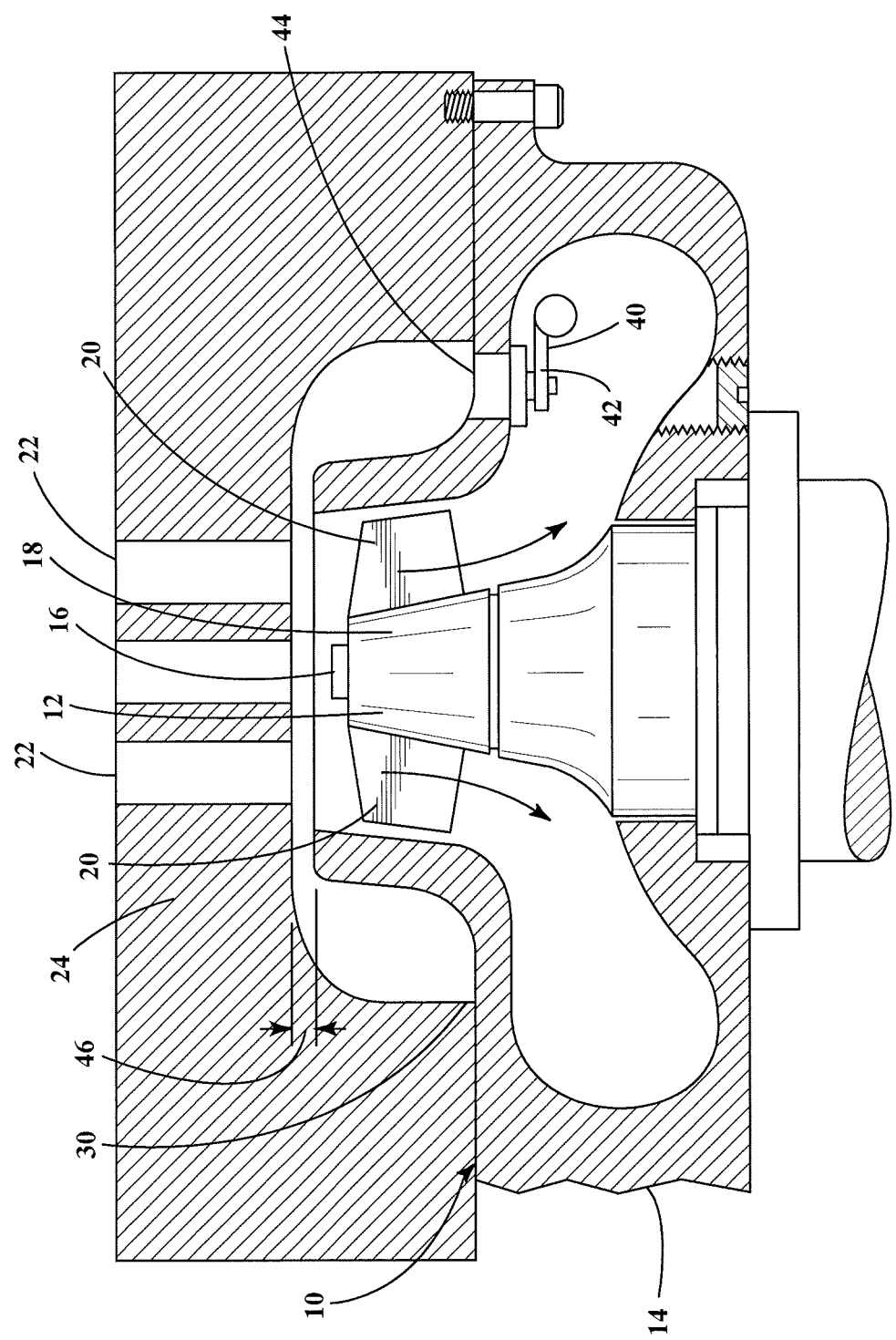
FIG. 1 is a cross-sectional view of a turbine housing with an axial-flow turbine and a waste gate valve with a closely coupled manifold.

The wastegate bypass port 44 includes a specifically sized flow gap 46 between the cylinder head or manifold 24 with a flow area that is greater than the bypass port area. As an example of FIG. 1, the flow gap 46 used with the wastegate assembly 40 can be up to two times the bypass port area, with a preferred flow gap approximately 1.2 times that of the bypass port area. This allows gas flow to be equally drawn from each cylinder's flow. FIG. 1 shows the flow gap 46 as part of the exhaust area between a cylinder head and the turbine housing 14.

The pulse energy enhanced turbine 10 with a turbine wheel 12 reacts to separate individual pulses of exhaust gas flow from ports 22 in a manifold 24 that are substantially equally spaced around the face of the turbine wheel 12. Each port 22 directs individual pulsations onto the turbine 10 with resulting alternate pulsations across the face of the turbine wheel 12. Exhaust pulsation energy can be used in a closely coupled manifold 24 to deliver both higher efficiency and low inertia without a fixed stator to control flow.

Figure 3:
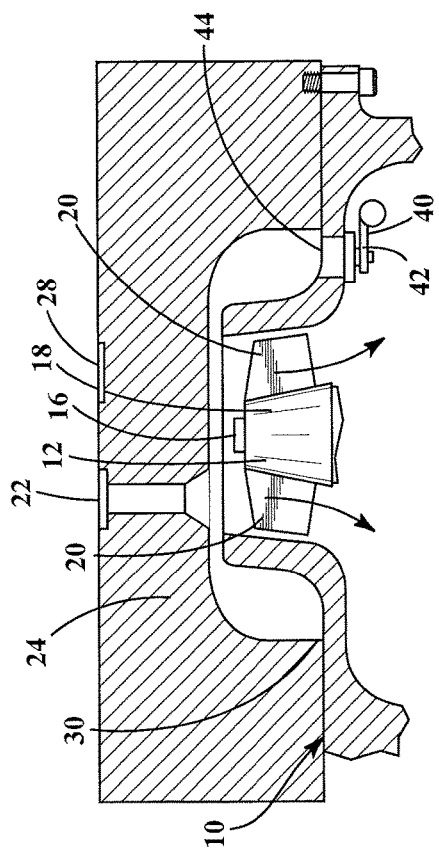
FIG. 3 is cross-sectional view of the turbine housing of Section B-B.
Figure 5:
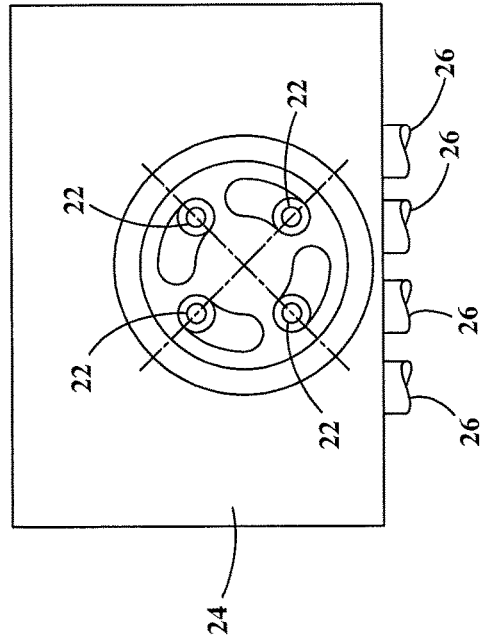
FIG. 5 is a view of a portion of a turbine housing with four ports separated by 90 degrees.
Figure 2:
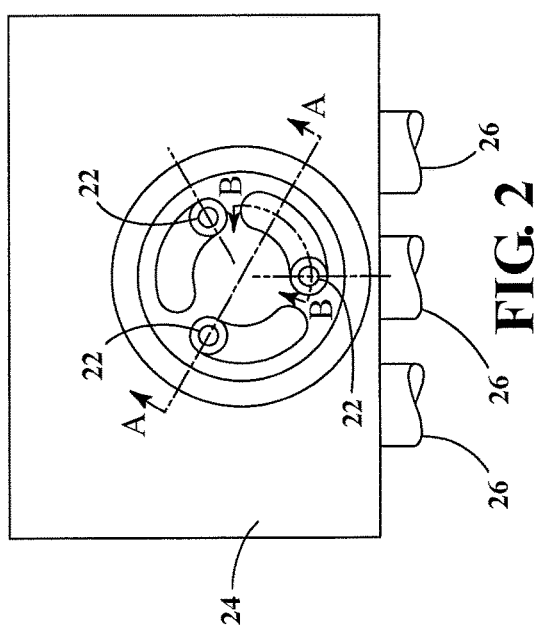
FIG. 2 is a view of a portion of a turbine housing with three ports separated by 120 degrees.

The turbine 10 receives individual pulses via equidistant ports 22 around the face of the turbine wheel 12. The number of ports 22 in the manifold 24 preferably corresponds with the number of cylinders, and the separation and arrangement of ports 22 depends on the number of ports. For example, a three-cylinder engine has three ports separated by approximately 120 degrees as shown in FIGS. 2-3. Similarly, as shown in FIGS. 5 and 7, a four-cylinder engine has four ports separated by approximately 90 degrees, a five-cylinder engine by approximately 72 degrees, and a six-cylinder engine by approximately 60 degrees. The arrangement of individual ports 22 will be fixed by the physical layout of the exhaust and to alternate pulsations across the face of the turbine wheel 12.

Figure 8:
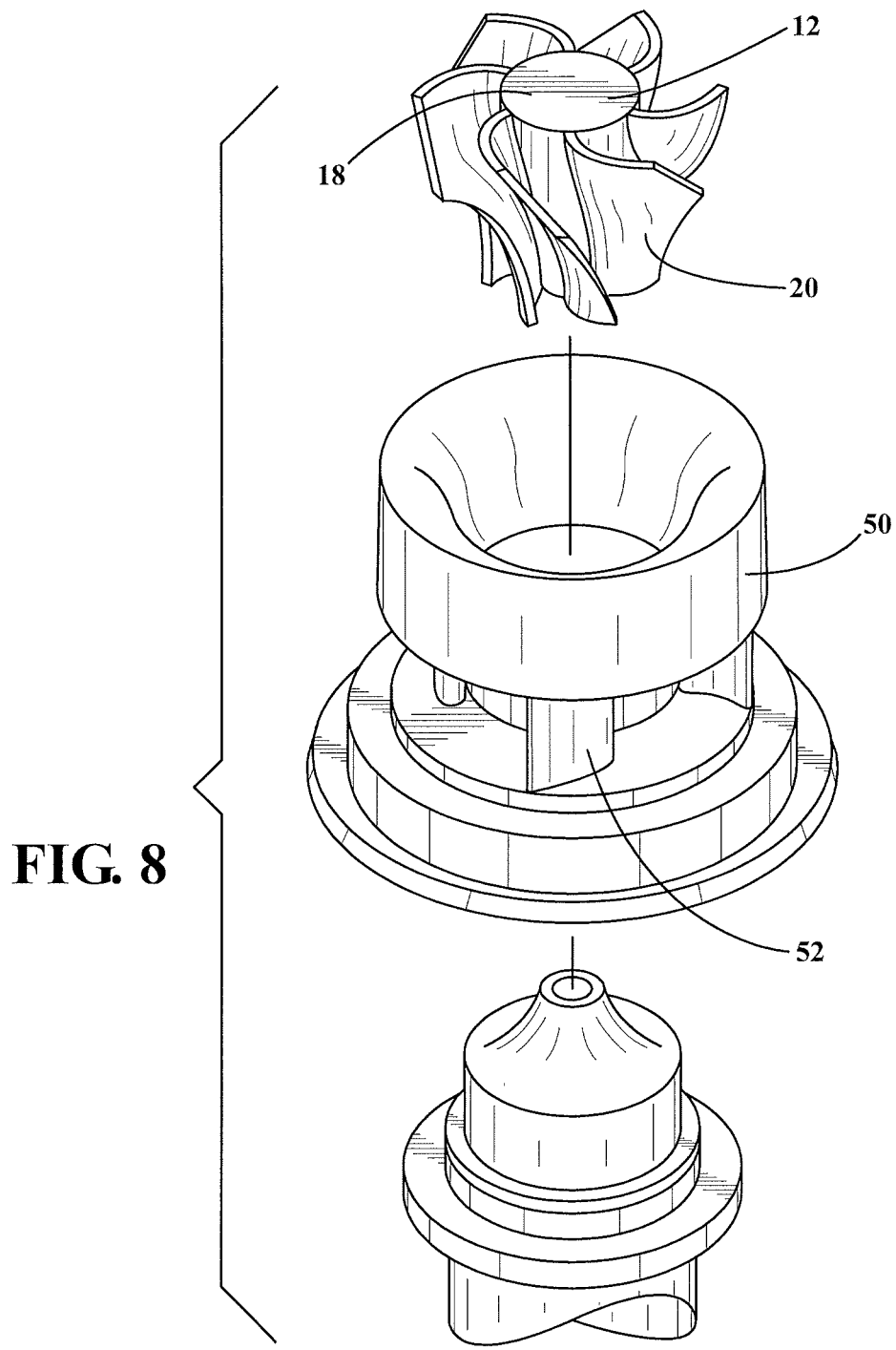
FIG. 8 shows an expanded turbine portion with the turbine wheel above a spoked support with gaps for gas flow between the spokes.

FIG. 8 shows the turbine wheel 12 in an expanded relation to a support 50 for the contour. The support 50 as shown has three spokes 52 as a preferred embodiment, but other numbers of spokes could be used. The spokes 52 are preferably aerodynamically angled in a curved radial position with gaps for gas flow between the spokes 52. The support 50 is particularly useful with inserting the turbine wheel 12 into a turbine-integrated manifold wherein the gaps between the spokes 52 preferably align with the volute of the turbine housing 14 as shown in FIG. 6. As shown, the base of the support 50 can form a portion of the volute passage, and the base can be secured to the turbine housing 14.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A turbocharger comprising a turbine (10) having a turbine wheel (12) in a turbine housing (14) with an exhaust manifold (24) having ports (22) spaced around an axis of the turbine wheel (12) that direct separate pulses of exhaust gas to the turbine wheel (12) and a wastegate assembly (40) in the turbine housing (14) for regulating exhaust gas flow, wherein each port (22) has a tapered port edge (28) for residual gas flow in the direction of movement of blades (20) of the turbine wheel (12).

2. A turbocharger comprising a turbine (10) having a turbine wheel (12) in a turbine housing (14) with an exhaust manifold (24) having ports (22) spaced around a face of the turbine wheel (12) that direct separate pulses of exhaust gas to the turbine wheel (12) and a wastegate assembly (40) in the turbine housing (14) for regulating exhaust gas flow, wherein each of the separate pulses of exhaust gas corresponds to one cylinder of an engine associated with the turbocharger and the number of ports (22) is the same as the number of cylinders of the engine.

3. The turbocharger of claim 2 wherein exhaust gas pulsation energy is used to control gas flow in the exhaust manifold (24) with individual unobstructed passageways (26) to each port (22), wherein the exhaust manifold is coupled to the turbine (10).

4. The turbocharger of claim 2 having three ports separated by 120 degrees for the engine having three cylinders.

5. The turbocharger of claim 2 having four ports separated by 90 degrees for the engine having four cylinders.

6. The turbocharger of claim 2 having five ports separated by 72 degrees for the engine having five cylinders.

7. The turbocharger of claim 2 having six ports separated by 60 degrees for the engine having six cylinders.

8. The turbocharger according to claim 2, wherein the ports (22) are spaced around an axis of the turbine wheel (12).

* * * * *